United States Patent
Osborn et al.

(10) Patent No.: US 10,025,099 B2
(45) Date of Patent: Jul. 17, 2018

(54) ADJUSTED LOCATION HOLOGRAM DISPLAY

(71) Applicant: Microsoft Technology Licensing, LLC, Redmond, WA (US)

(72) Inventors: Dan Osborn, Woodinville, WA (US); Anatolie Gavriliuc, Kirkland, WA (US); Stephen Heijster, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 246 days.

(21) Appl. No.: 14/736,038

(22) Filed: Jun. 10, 2015

(65) Prior Publication Data

US 2016/0363767 A1 Dec. 15, 2016

(51) Int. Cl.
*G02B 27/01* (2006.01)
*G03H 1/00* (2006.01)
*G03H 1/30* (2006.01)
*G09G 3/00* (2006.01)
(Continued)

(52) U.S. Cl.
CPC ....... *G02B 27/0172* (2013.01); *G03H 1/0005* (2013.01); *G03H 1/0891* (2013.01); *G03H 1/30* (2013.01); *G09G 3/001* (2013.01); *G02B 2027/014* (2013.01); *G02B 2027/0174* (2013.01); *G03H 2001/262* (2013.01)

(58) Field of Classification Search
CPC .......... G02B 27/0172; G02B 2027/014; G02B 2027/0174; G03H 1/0005; G03H 1/30; G03H 2001/262; G03H 1/0891; G09G 3/001
See application file for complete search history.

(56) References Cited

U.S. PATENT DOCUMENTS

| | | |
|---|---|---|
| 6,211,848 B1 | 4/2001 | Plesniak et al. |
| 8,233,206 B2 | 7/2012 | Kramer et al. |
| 8,405,680 B1 | 3/2013 | Cardoso Lopes et al. |

(Continued)

FOREIGN PATENT DOCUMENTS

EP 1569172 A2 8/2005

OTHER PUBLICATIONS

ISA European Patent Office, International Search Report and Written Opinion Issued in PCT Application No. PCT/US2016/032945, dated Oct. 24, 2016, WIPO, 24 Pages. (MS# 357140-WO-PCT).

(Continued)

*Primary Examiner* — Charles Hicks
(74) *Attorney, Agent, or Firm* — Alleman Hall Creasman & Tuttle LLP

(57) ABSTRACT

A method for displaying holograms may include displaying an initial hologram via a display device comprising an at least partially see-through display, the initial hologram located on a virtual surface at an initial virtual location. Subsequently, an instruction is received to display a subsequent hologram on the virtual surface at a subsequent virtual location. Collision detection is performed to determine that the subsequent hologram would collide with the initial hologram. In response, the subsequent hologram is displayed at an adjusted virtual location that is closer to the display device than the initial virtual location of the initial hologram.

18 Claims, 14 Drawing Sheets

(51) Int. Cl.
*G03H 1/26* (2006.01)
*G03H 1/08* (2006.01)

(56) References Cited

U.S. PATENT DOCUMENTS

| | | |
|---|---|---|
| 8,947,455 B2 | 2/2015 | Friesen |
| 2006/0277466 A1 | 12/2006 | Anderson |
| 2010/0159434 A1 | 6/2010 | Lampotang et al. |
| 2012/0013613 A1 | 1/2012 | Vesely |
| 2012/0058823 A1 | 3/2012 | Minato et al. |
| 2012/0113140 A1 | 5/2012 | Hilliges et al. |
| 2013/0155106 A1 | 6/2013 | Rolleston et al. |
| 2013/0286004 A1 | 10/2013 | McCulloch et al. |
| 2013/0293585 A1 | 11/2013 | Sudou |
| 2013/0326364 A1* | 12/2013 | Latta .............. G06F 3/012 715/751 |
| 2013/0342572 A1 | 12/2013 | Poulos et al. |
| 2014/0049559 A1 | 2/2014 | Fleck et al. |
| 2014/0104274 A1 | 4/2014 | Hilliges et al. |
| 2014/0282162 A1 | 9/2014 | Fein et al. |
| 2014/0313225 A1 | 10/2014 | Lee et al. |

OTHER PUBLICATIONS

"Microsoft HoloLens", Published on: Jan. 21, 2015, Available at: http://www.microsoft.com/microsoft-hololens/en-us.

Bimber, et al., "Alternative Augmented Reality Approaches: Concepts, Techniques, and Applications", In Proceedings of Eurographics Tutorial Notes, Sep. 2, 2003, 61 pages.

IPEA European Patent Office, Second Written Opinion Issued in PCT Application No. PCT/US2016/032945, dated Feb. 27, 2017, WIPO, 9 Pages.

"International Preliminary Report on Patentability Issued in PCT Application No. PCT/US2016/032945", dated Aug. 28, 2017, 10 Pages. (MS# 357140-WO-PCT).

* cited by examiner

ADJUSTED LOCATION HOLOGRAM DISPLAY

BACKGROUND

User interfaces may display and facilitate user manipulation of virtual objects. For example, computer-aided design applications enable users to create, analyze and manipulate various shapes and objects. In some applications, when two objects are occupying a common area or space in the viewing environment, a drawing order of the objects may be used to display one of the objects on top of the other object.

Some technologies enable users to experience a fully or partially virtual world that includes three dimensional holograms. For example, some virtual reality head-mounted display (HMD) devices may display a fully-immersive, entirely virtual environment with no view of the real world. Other, augmented reality HMD devices may include a partially transparent display that blends a user's view of the real world with displayed virtual objects, such as holograms, and other content.

Manipulating virtual content in a virtual reality or augmented reality environment can prove challenging. For example, where a user directs one hologram of a virtual object to occupy a position at which another hologram of another object is also located, the two virtual objects may be displayed as inter-penetrating one another or otherwise being intermingled. Such behavior is markedly different than corresponding behavior of real world objects in a similar situation. Accordingly, displaying holograms in this manner may detract from the realism of the user experience.

SUMMARY

To address these issues, a head-mounted display device and method are provided for displaying holograms at adjusted virtual locations. The computing device may comprise a non-volatile storage device holding instructions executable by the processor to: display an initial hologram via a display device comprising an at least partially see-through display configured to visually augment a view of a real world three dimensional environment through the display, the initial hologram located on a virtual surface at an initial virtual location in a three dimensional coordinate space overlaid upon the real world three dimensional environment; subsequently receive an instruction to display a subsequent hologram on the virtual surface at a subsequent virtual location in the three dimensional coordinate space; perform collision detection to determine that the subsequent hologram at the subsequent virtual location would collide with the initial hologram at the initial virtual location; and in response, display the subsequent hologram at an adjusted virtual location that is closer to the display device than the initial virtual location of the initial hologram in the three dimensional coordinate space.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present descriptions relate to displaying holograms at adjusted virtual locations that are closer to a display device than an initial virtual location. In some examples, the display device may comprise an HMD device, such as an augmented reality display device that includes an at least partially see-through display configured to visually augment a view of a real world three dimensional environment through the display. In other examples, the HMD device may comprise a fully-immersive virtual reality display device.

Figure 1:
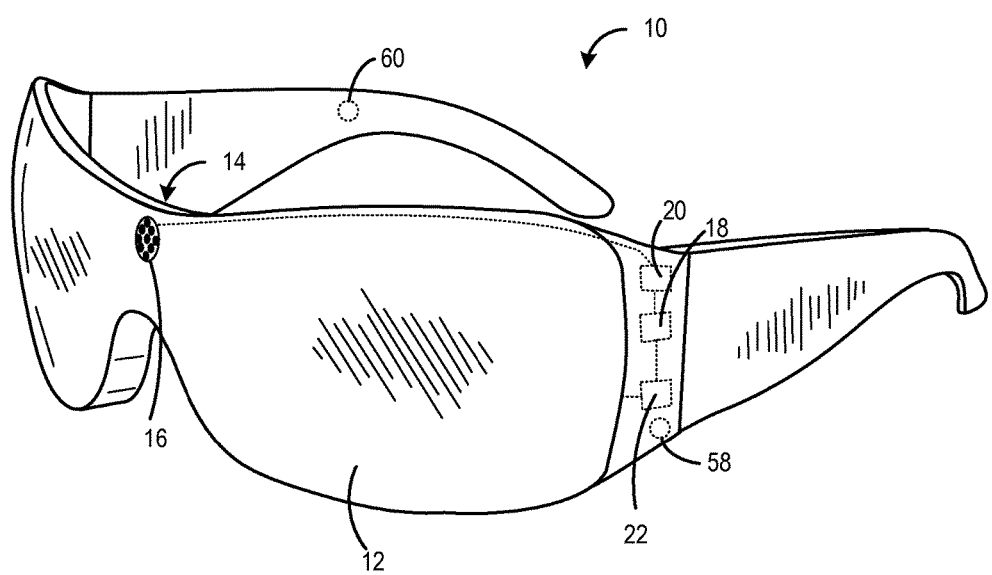
FIG. 1 shows a head-mounted display device according to an example of the present description.

FIG. 1 illustrates an HMD device 10 according to an example of the present disclosure. In this example, the illustrated HMD device 10 takes the form of wearable glasses or goggles, but it will be appreciated that other forms are possible. The HMD device 10 includes an at least partially see-through stereoscopic display 12 that may be configured to visually augment a view of a real world three dimensional environment by the user through the display.

For example, the HMD device 10 may include an image production system 22 that is configured to display virtual objects such as holograms to the user with the at least partially see-through display 12. The holograms may be visually superimposed onto the physical environment so as to be perceived at various depths and locations. The HMD device 10 may use stereoscopy to visually place a virtual object at a desired depth by displaying separate images of the virtual object to both of the user's eyes.

To achieve the perception of depth, the image production system 22 of the HMD device 10 may render the two images of the virtual object at a rendering focal plane of the HMD device 10, such that there is a binocular disparity between the relative positions of the virtual object in the two images. For example, such binocular disparity may be a horizontal disparity where the relative positions of the virtual object in the two images are separated by a distance in the x axis direction. In this embodiment, the x axis may be defined as the axis extending horizontally to the left and the right relative to the user, the y axis extending upward and downward vertically relative to the user, and the z axis extending forward and backward relative to the user, and orthogonally to the x and y axes.

The horizontal disparity between the relative positions of the virtual object in the two images will cause the user to perceive that the virtual object is located at a certain depth within the viewed physical environment due to stereopsis. Using this stereoscopy technique, the HMD device 10 may control the displayed images of the virtual objects, such that the user may perceive that the virtual objects exist at a desired depth and location in the viewed real world three dimensional environment.

In other examples, the at least partially see-through display 12 and image production system 22 may utilize other image display technologies and configurations. For example, the at least partially see-through display 12 may be configured to enable a wearer of the HMD device 10 to view a physical, real-world object in the physical environment through one or more partially transparent pixels that are displaying a virtual object representation.

In some examples the display 12 may include image-producing elements located within lenses (such as, for example, a see-through Organic Light-Emitting Diode (OLED) display). As another example, the display 12 may include a light modulator on an edge of the lenses. In this example, the lenses may serve as a light guide for delivering light from the light modulator to the eyes of a wearer. Such a light guide may enable a wearer to perceive a 3D holographic image located within the physical environment that the wearer is viewing, while also allowing the wearer to view physical objects in the physical environment, thus creating an augmented reality environment.

The HMD device 10 includes an optical sensor system 14 that may include one or more optical sensors. In one example, the optical sensor system 14 may include an outward facing optical sensor 16 that may be configured to detect the real world environment from a similar vantage point (e.g., line of sight) as observed by the user through the see-through display 12. The optical sensor system 14 may include a variety of additional sensors, such as a depth camera and an RGB camera, which may be a high definition camera or have another resolution.

The HMD device 10 may further include a position sensor system 18 that may include one or more position sensors such as accelerometer(s), gyroscope(s), magnetometer(s), global positioning system(s), multilateration tracker(s), and/or other sensors that output position sensor information useable as a position, orientation, and/or movement of the relevant sensor.

Optical sensor information received from the optical sensor system 14 and/or position sensor information received from position sensor system 18 may be used to assess a position and orientation of the vantage point of the see-through display 12 relative to other environmental objects. In some embodiments, the position and orientation of the vantage point may be characterized with six degrees of freedom (e.g., world-space X, Y, Z, pitch, roll, and yaw). The vantage point may be characterized globally or independently of the real world background. The position and/or orientation may be determined with an on-board computing system (e.g., on-board computing system 20) and/or an off-board computing system.

The optical sensor information and the position sensor information may be used by a computing system to perform analysis of the real world three dimensional environment, such as depth analysis, surface reconstruction, environmental color and lighting analysis, or other suitable operations. In particular, the optical and positional sensor information may be used to create a virtual model of the real world three dimensional environment. In some examples, the virtual model may comprise a three dimensional coordinate space that is overlaid upon the real world three dimensional environment. In some examples, such sensor information may be provided to another computing device, such as a server, that creates the virtual model of the real world three dimensional environment.

In some examples, the position and orientation of the vantage point may be characterized relative to this virtual space. Moreover, the virtual model may be used to determine positions of holograms and other virtual objects in the virtual space, and to add additional holograms to be displayed to the user at a desired depth and location within the virtual world.

In some examples, the on-board computing system 20 and/or off-board computing system may include logic for detecting collisions between two or more holographic objects in a virtual model of the real world three dimensional environment, and/or between a holographic object and a real world object. As described in more detail below, in some examples such logic may utilize virtual bounding boxes associated with holograms and/or with real world objects to determine when a collision may occur. In other examples, other suitable collision detection logic and associated techniques may be utilized.

The HMD device 10 may also include a microphone system that includes one or more microphones, such as microphone 58, that capture audio data. In other examples, audio may be presented to the wearer via one or more speakers, such as speaker 60 on the HMD device 10.

Figure 2:
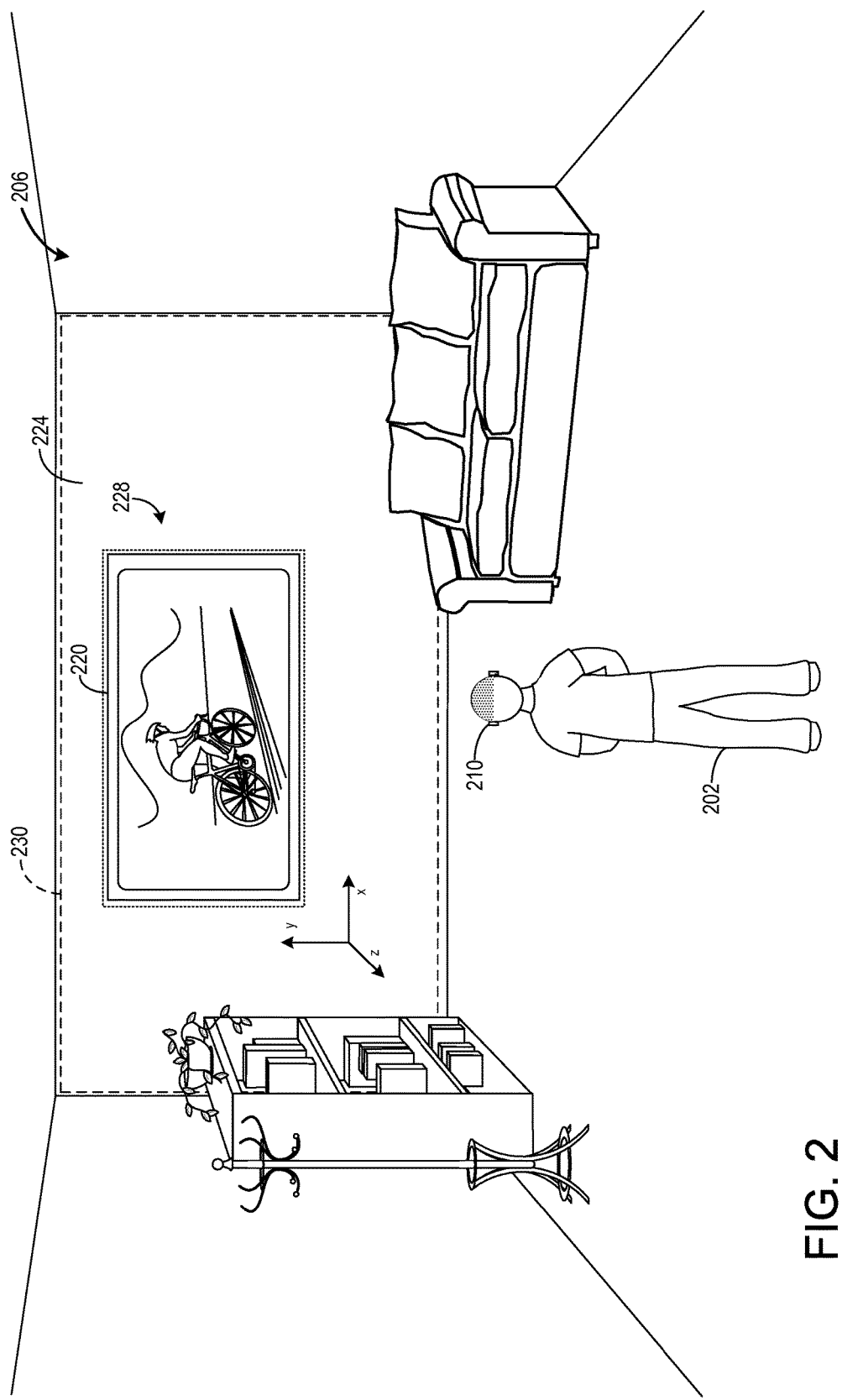
FIG. 2 shows a user wearing head-mounted display devices of FIG. 1 in a room according to an example of the present description.

With reference now to FIGS. 2-14, example use cases illustrating aspects of the present disclosure will now be presented. As schematically shown in FIG. 2, a user 202 may be standing in a living room 206 and may wear a display device 210, which in this example may take the form of HMD device 10 shown in FIG. 1. As noted above, display device 210 (HMD device 10) may comprise an at least partially see-through display configured to visually augment the view of user 202 through the display of the real world three dimensional environment of living room 206. The display device 210 may generate a virtual model of the living room 206 using a three dimensional coordinate space overlaid upon the real world living room. In the example of FIG. 2, such three dimensional coordinate space is indicated by the x-y-z axes.

In one example, a user may desire to preview one or more items in the user's environment before purchasing the items. In the example of FIG. 2, user 202 may be considering purchasing a framed poster of his favorite cyclist for his living room 206. The user may view an initial hologram 220 of the cyclist poster via the display device 210. The user may instruct the display device 210 to position the initial hologram 220 on wall 224. In response, the display device 210 may locate the initial hologram 220 on a virtual surface that corresponds to wall 224 at an initial virtual location 228 in the three dimensional coordinate space. In the example of FIG. 2, the virtual surface corresponding to wall 224 is indicated in dashed lines at 230.

In some examples, the initial hologram 220 may be substantially planar in the x-axis and y-axis directions, and may have a depth in the z-axis direction. In other examples, the initial hologram 220 may be substantially flat with a small or negligible depth in the z-axis direction. In some examples, the initial hologram 220 may also be animated and may change shape over time. In other examples, holograms may take a variety of three dimensional shapes and volumes such as, for example, round, oblong, conical, etc., and any combination of shapes and volumes.

In some examples, the virtual surface 230 may be world-locked in a position that is fixed in the three dimensional coordinate space overlaid upon the real world three dimensional environment. In some examples, the initial hologram 220 also may be world-locked in the three dimensional coordinate space. The initial virtual location 228 of the initial hologram 220 may comprise a position of the initial hologram 220 in the three dimensional coordinate space. For example, the initial virtual location 228 may be described as a volume of space occupied by the initial hologram 220 and having initial x-axis coordinates, initial y-axis coordinates and initial z-axis coordinates relative to the display device 210.

Figure 5:
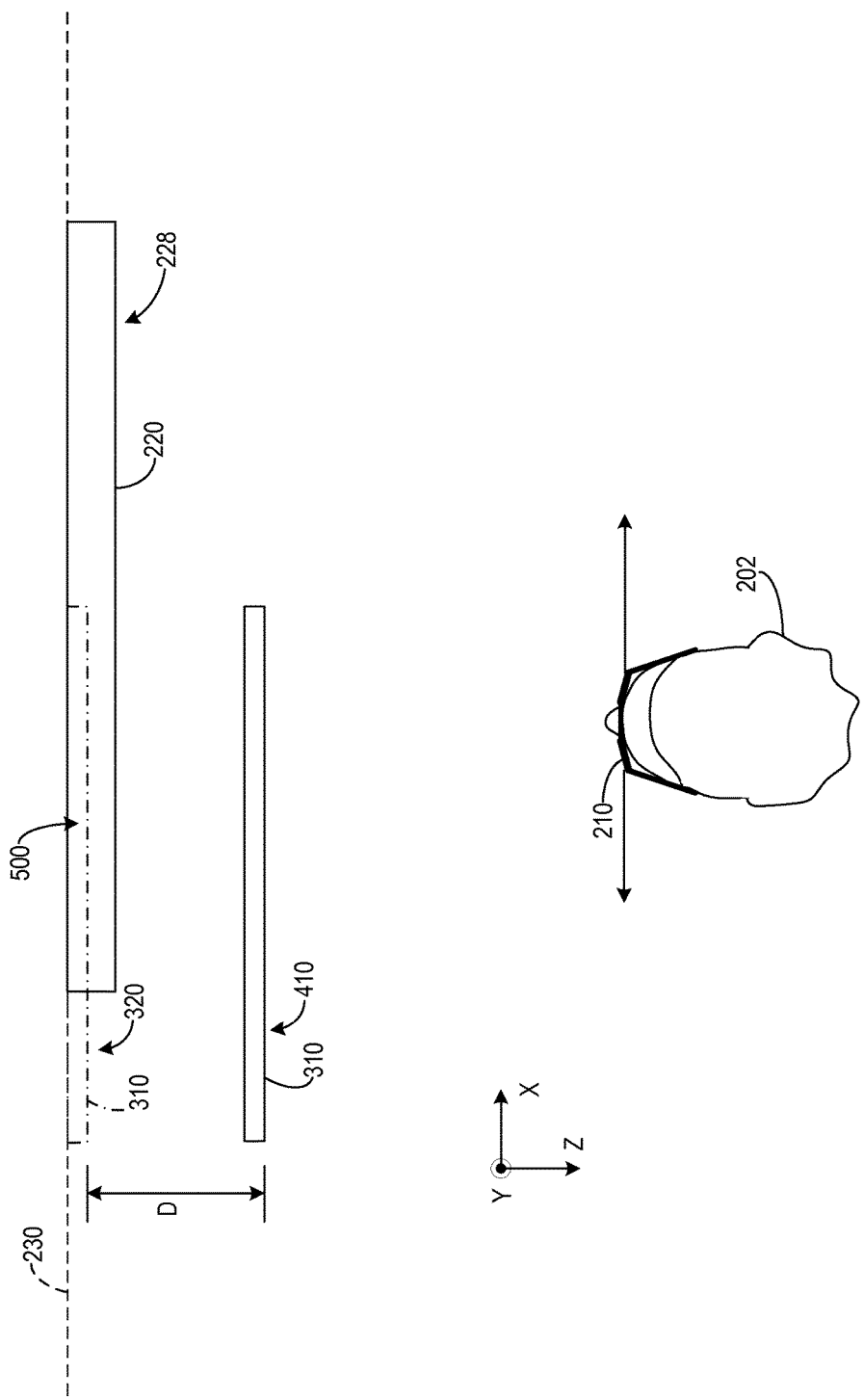
FIG. 5 shows a top view of the two holograms of FIG. 4 displayed according to an example of the present disclosure.

With reference also to FIG. 5, in some examples the initial hologram 220 may be have a depth in the z-axis direction. In other examples, holograms may be substantially flat and two-dimensional, and may have a single z-axis coordinate relative to the display device 210. In other examples, two-dimensional and three-dimensional holograms may have x-axis, y-axis and z-axis coordinates relative to a fixed location in the coordinate space.

Figure 3:
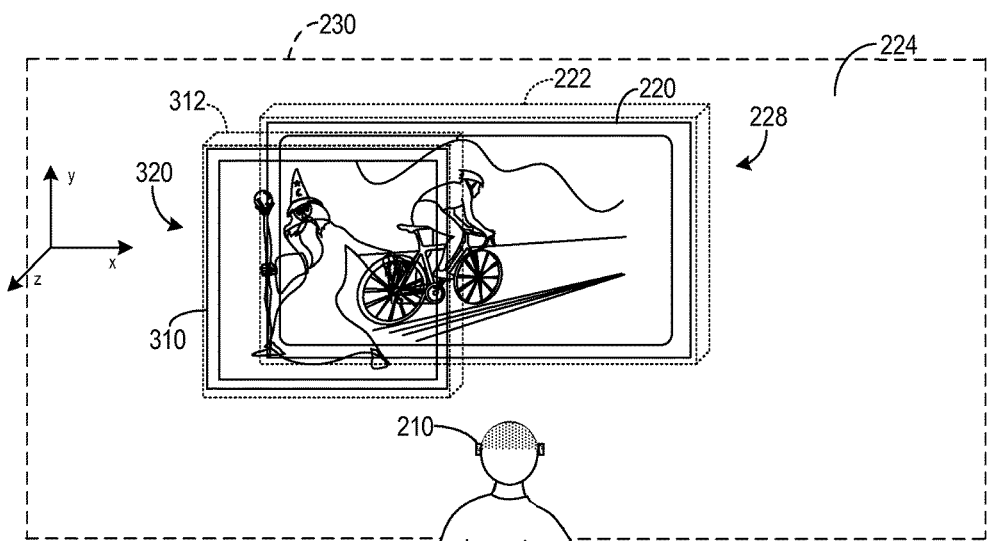
FIG. 3 shows the user from FIG. 2 and two holograms displayed according to an example of the present description.

With reference now to FIG. 3, the user 202 also may be interested in a framed poster of his favorite wizard. The user may instruct the display device 210 to display a subsequent hologram 310 of the framed wizard poster on the wall 224. As with the initial hologram 220, in some examples, the subsequent hologram 310 may be substantially planar in the x-axis and y-axis directions, and may have a depth in the z-axis direction. In other examples, the subsequent hologram 310 may be substantially flat with a small or negligible depth in the z-axis direction. In other examples the subsequent hologram 310 may take a variety of three dimensional shapes and volumes such as, for example, round, oblong, conical, etc., and any combination of shapes and volumes, and also may be animated to change shape over time. In the example of FIG. 3, the user 202 may instruct the display device 210 to display the subsequent hologram 310 on the wall 224 at a subsequent virtual location 320 in the three dimensional coordinate space.

In this example and as shown in FIGS. 3 and 5, if the subsequent hologram 310 were to be displayed on the virtual surface 230 corresponding to wall 224 at the subsequent virtual location 320, the subsequent hologram would partially overlap the initial hologram 220 in the x-axis, y-axis and z-axis directions. Additionally, as both the initial hologram 220 and subsequent hologram 310 would be located on the virtual surface 230 in the z-axis direction, both holograms would occupy common volume, as indicated at 500 in FIG. 5. Accordingly, if displayed in this manner, the two holograms would intermingle in three dimensional space and may appear distorted and otherwise less than realistic to user 202. FIG. 3 shows a schematic example of such intermingling of the initial hologram 220 and subsequent hologram 310.

After receiving the user's instruction to display the subsequent hologram 310 on the wall 224 at a subsequent virtual location 320, the display device 210 may perform collision detection to determine if the subsequent hologram 310 at the subsequent virtual location 320 would collide with the initial hologram 220 at the initial virtual location 228. In other words, the display device 210 may determine whether the subsequent hologram 310 at the subsequent virtual location 320 would penetrate or occupy common space or volume with the initial hologram 220 at the initial virtual location 228.

Figure 4:
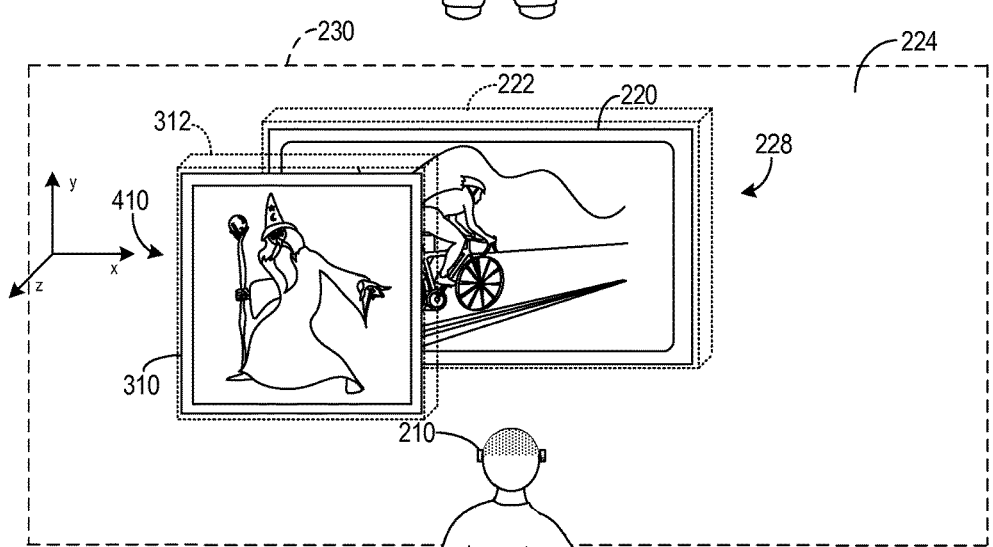
FIG. 4 shows a hologram of FIG. 3 displayed at an adjusted virtual location according to an example of the present description.

In some examples, collision detection may be performed by analyzing virtual bounding boxes associated with the initial hologram 220 and subsequent hologram 310. In FIGS. 3 and 4, an initial bounding box 222 associated with initial hologram 220 and a subsequent bounding box 312 associated with the subsequent hologram 310 are illustrated. The initial bounding box 222 may have approximately the same size as the initial hologram 220, and the subsequent bounding box 312 may have approximately the same size as the subsequent hologram 310. If the subsequent bounding box 312 would collide with the initial bounding box 222, then the display device may determine that a collision of the corresponding holograms would occur.

In the present example and as schematically shown in FIGS. 3 and 5, displaying the subsequent hologram 310 at the subsequent virtual location 320 would cause the subsequent hologram to collide with the initial hologram 220 displayed at the initial virtual location 228. Accordingly and with reference to FIG. 4, in response the display device 210 may display the subsequent hologram 310 at an adjusted virtual location 410 that is closer to the display device 210 than the initial virtual location of the initial hologram 220 in the three dimensional coordinate space. In this manner and as schematically illustrated in FIGS. 4 and 5, the user 202 may more clearly and comfortably view the later-displayed subsequent hologram 310 and the initial hologram 220. Additionally, and because the two holograms are not intermingled, the visual realism of the holograms is maintained. Further, because the user 202 interacted with the subsequent hologram 310 after interacting with the initial hologram 220, the subsequent hologram 310 is displayed in front of the initial hologram 220 to afford the user 202 with an unobstructed view of the subsequent hologram.

As shown in the example of FIG. 5, the display device 210 may display the subsequent hologram 310 at an adjusted virtual location 410 that is spaced a predetermined distance D from the initial virtual location 320 toward the display device 210 in the z-axis direction. In some examples, the predetermined distance D may be based on the distance from the display device 210 to the subsequent virtual location 320 and/or the initial virtual location 228. In other examples, a fixed predetermined distance may be utilized. In some examples, the predetermined distance D may be based on the size of the initial hologram 220, or on the size of the subsequent hologram 310, or on the size of both holograms.

In some examples, the x-axis coordinates and y-axis coordinates of the subsequent hologram 310 at the subsequent virtual location 410 may be the same as the x-axis coordinates and y-axis coordinates of the subsequent hologram 310 at the initial virtual location 320. In this manner, the user 202 may perceive the subsequent hologram 310 as moving toward the display device 210 in the z-axis direction alone. In other examples, in addition to moving in the z-axis direction, the subsequent hologram 310 may be moved in one or more of the x-axis and y-axis directions.

Figure 6:
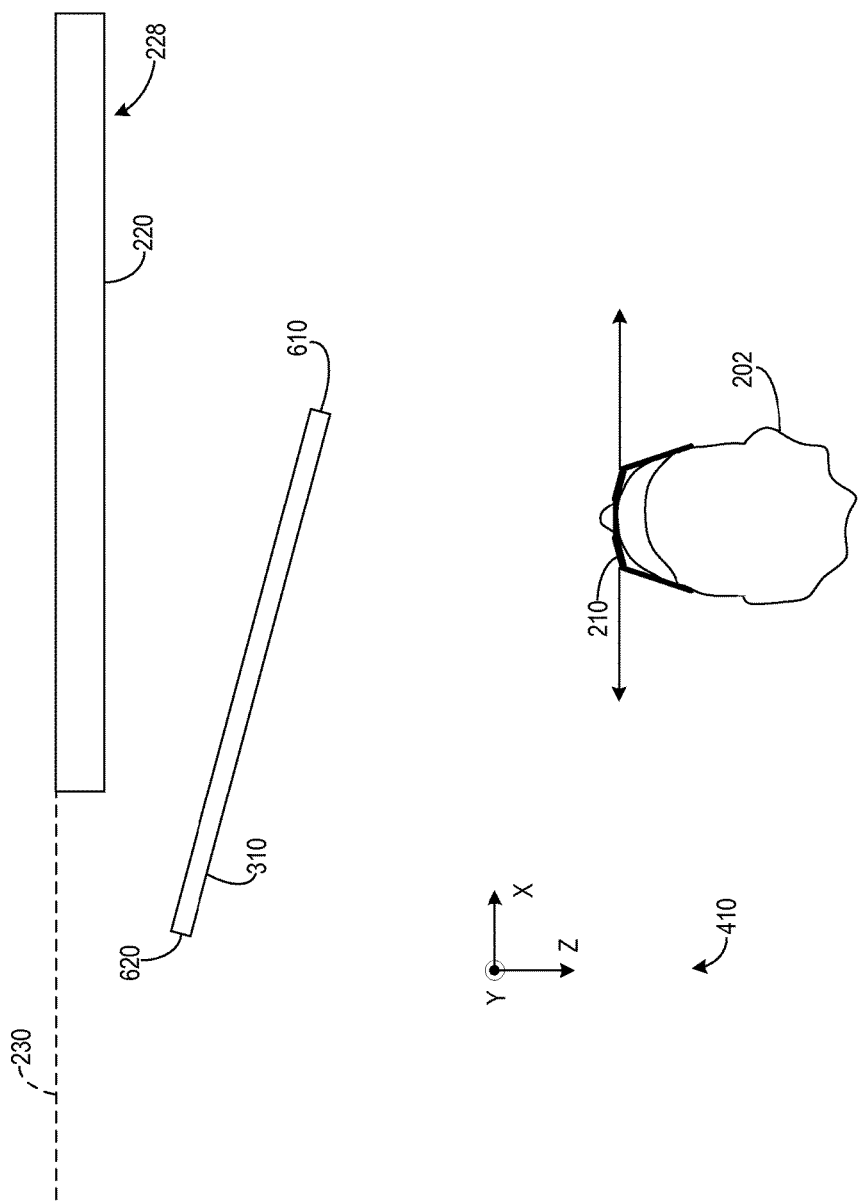
FIG. 6 shows a top view of the two holograms of FIG. 5 according to another example of the present disclosure.

In some examples and as shown in the examples of FIGS. 4 and 6, the subsequent hologram 310 at the adjusted virtual location 410 may overlap the initial hologram 220. In these examples, the subsequent hologram 310 at the adjusted virtual location 410 overlaps the initial hologram 220 in the x-axis and the y-axis directions from the viewing point of the display device 210.

With reference now to FIG. 6, in some examples the display device 210 may display the subsequent hologram 310 at an adjusted virtual location in which the subsequent hologram is tilted toward the display device. In this example, the subsequent hologram 310 may be rotated clockwise about an axis in the y-axis direction to display a first end 610 of the hologram closer to the display device 210, and a second, opposite end 620 further away from the display device. In this manner, the distinction between the subsequent hologram 310 and the initial hologram 220 may be visually emphasized to the user 202. In some examples, the subsequent hologram 310 may be tilted such that the second end 620 that is not overlapping the initial hologram 220 is displayed at or near the virtual surface 230 at which the user 202 instructed the display device to display the subsequent hologram.

Figure 7:
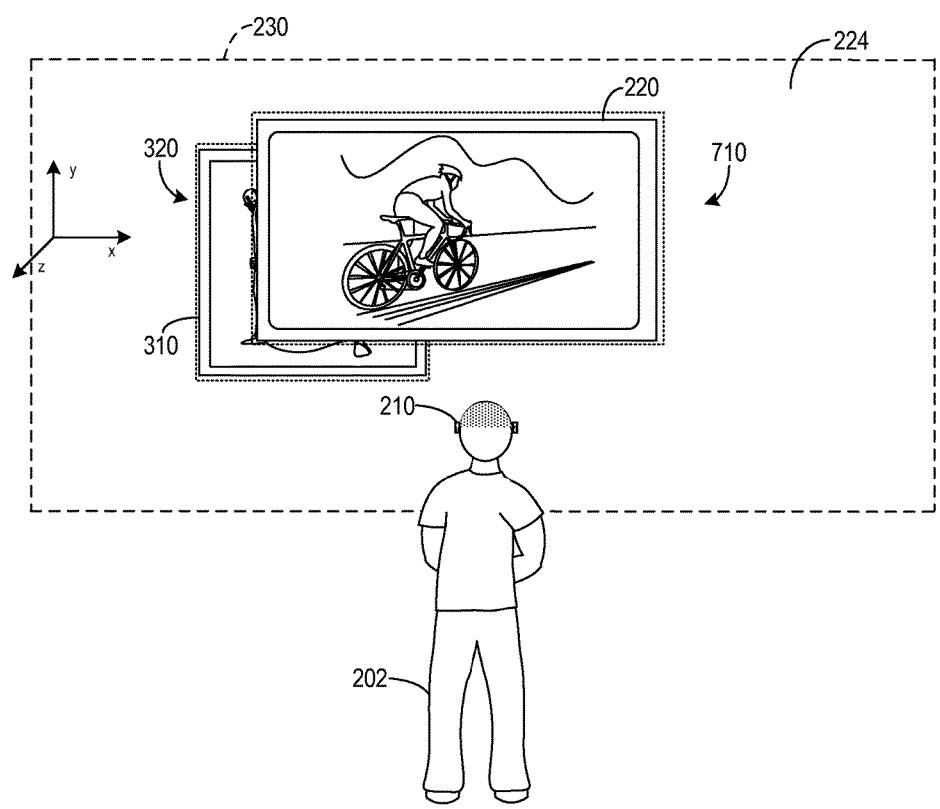
FIG. 7 shows the two holograms of FIG. 4 displayed according to another example of the present description
Figure 8:
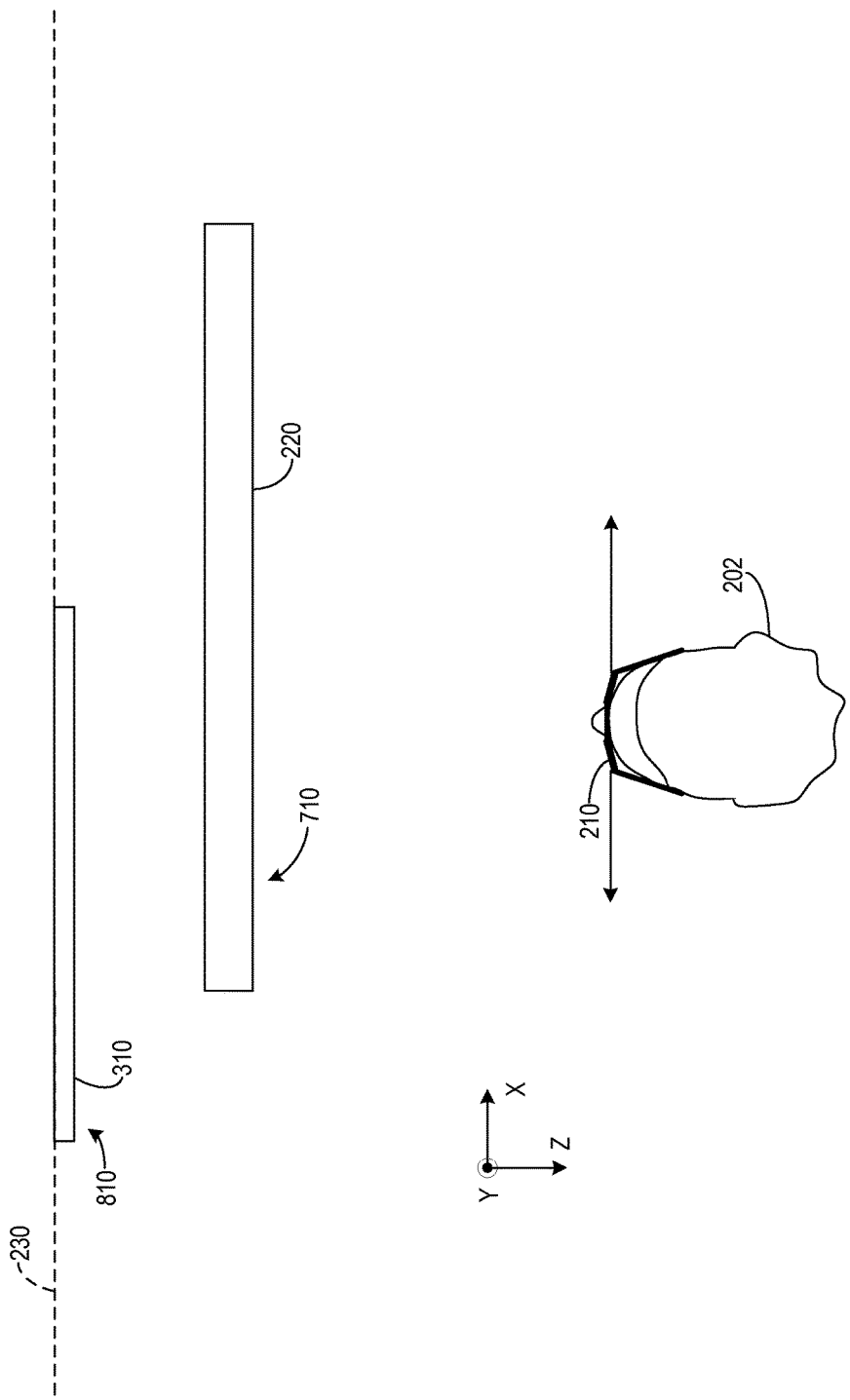
FIG. 8 shows a top view of the two holograms of FIG. 7.

With reference again to FIG. 4, in some examples where the subsequent hologram 310 is displayed in front of the initial hologram 220, the user 202 may desire to interact with the initial hologram 220. The user 202 may select the initial hologram 220 via user input, such as voice input, gesture recognition, eye tracking, or any other suitable user input. With reference now to FIGS. 7 and 8, in response to receiving the user's selection of the initial hologram 220, the display device 210 may display the initial hologram 220 at a moved virtual location 710 having a moved z-axis coordinate that is closer to the display device 210 than the initial z-axis coordinate of the initial hologram at the initial virtual location 228. Further, the moved virtual location 710 may have a moved z-axis coordinate that is closer to the display device 210 than the z-axis coordinate of the subsequent hologram 310. In this manner, the user 202 may more comfortably view the initial hologram 220 and the subsequent hologram 310.

In some examples, and in response to receiving the user's selection of the initial hologram 220, the z-axis locations of the initial hologram 220 and the subsequent hologram 310 may be swapped. For example, see the z-axis positions of the initial hologram 220 and subsequent hologram 310 in FIG. 4 as compared to FIG. 7. As shown in FIG. 8 and in one example, after swapping the subsequent hologram 310 may be displayed at a virtual location 810 having a z-axis coordinate equal to the z-axis coordinate of the initial virtual location 228 at which the initial hologram 220 was previously displayed.

Figure 9:
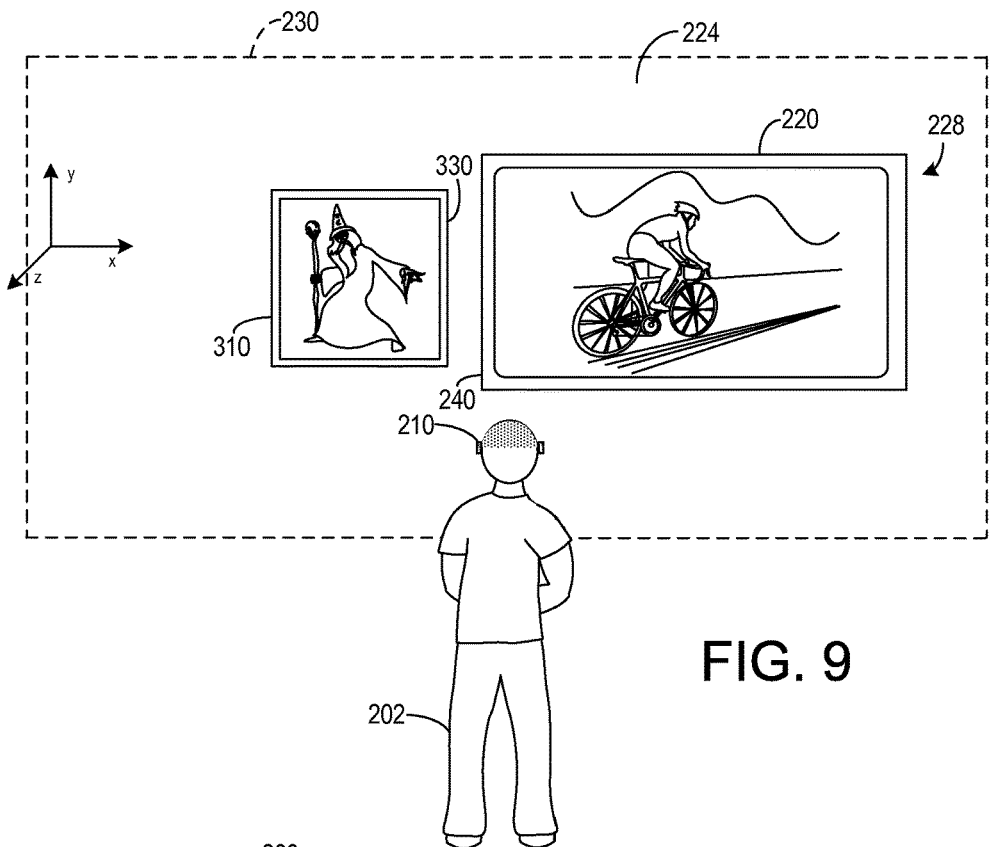
FIGS. 9 and 10 show a user wearing a head-mounted display device displaying two holograms according to another example of the present description.
Figure 10:
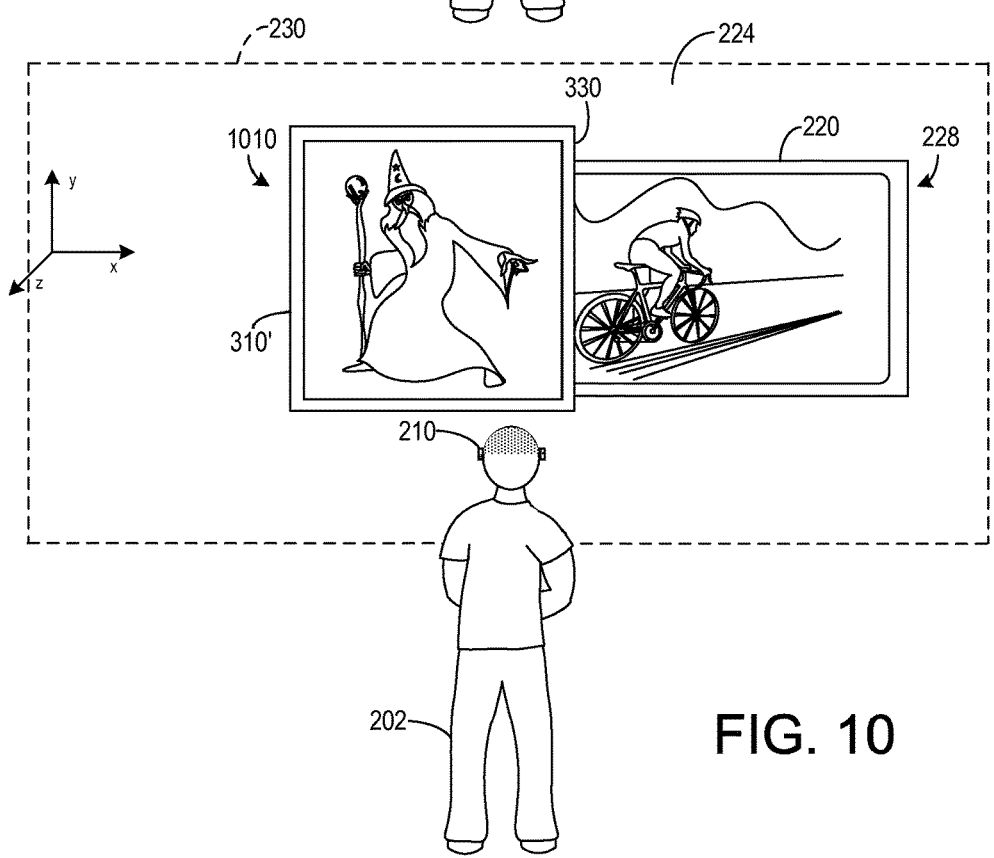

With reference now to FIGS. 9 and 10, in some examples the user 202 may provide an instruction to the display device 210 to change one or more of a size and an orientation of a hologram. In the example of FIG. 9, the display device 210 may display the subsequent hologram 310 at a first size and at a subsequent virtual location on the virtual surface 230 that does not overlap with the initial hologram 220 in either the x-axis or the y-axis directions.

As shown in FIG. 10, the user 202 may instruct the display device 210 to enlarge the subsequent hologram to a larger size as indicated at 310'. As the subsequent hologram is being enlarged, the display device 210 may perform collision detection to determine that the right edge 330 of the subsequent hologram 310 collides with the left edge 240 of the initial hologram 220. When such a collision is determined to occur, either before or at the time the two edges meet, the display device 210 may display the subsequent hologram 310/310' at an adjusted virtual location 1010 that is closer to the display device 210 in the z-axis direction than the initial virtual location 228 of the initial hologram 220.

In other examples, the user 202 may instruct the display device 210 to change the orientation of the subsequent hologram 310, such as by rotating the hologram. Where such a change in orientation causes a collision between the subsequent hologram 310 and the initial hologram 220, the subsequent hologram may be displayed at an adjusted virtual location that is closer to the display device 210 in the z-axis direction as described above.

Figure 11:
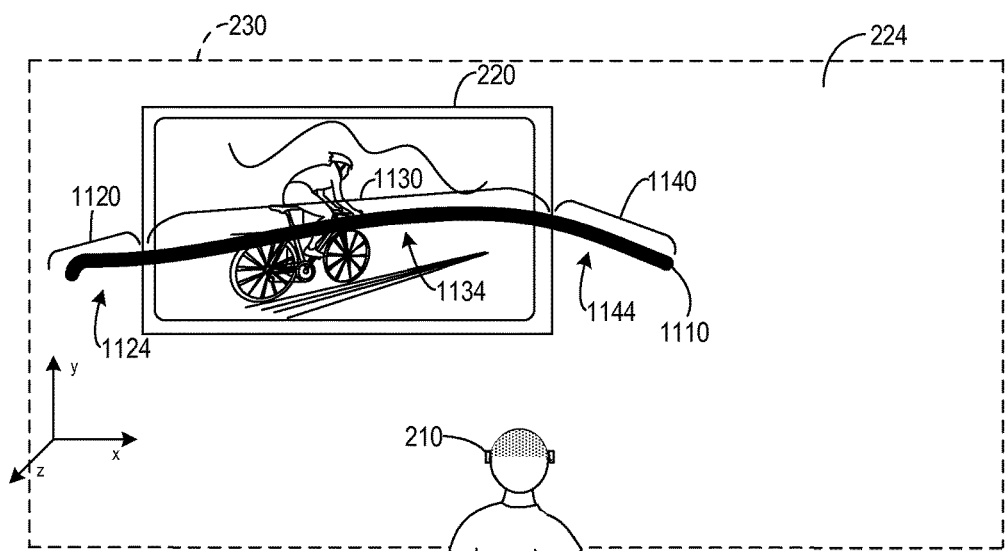
FIGS. 11 and 12 show a user wearing a head-mounted display device displaying a markup hologram overlapping another hologram according to another example of the present description.
Figure 12:
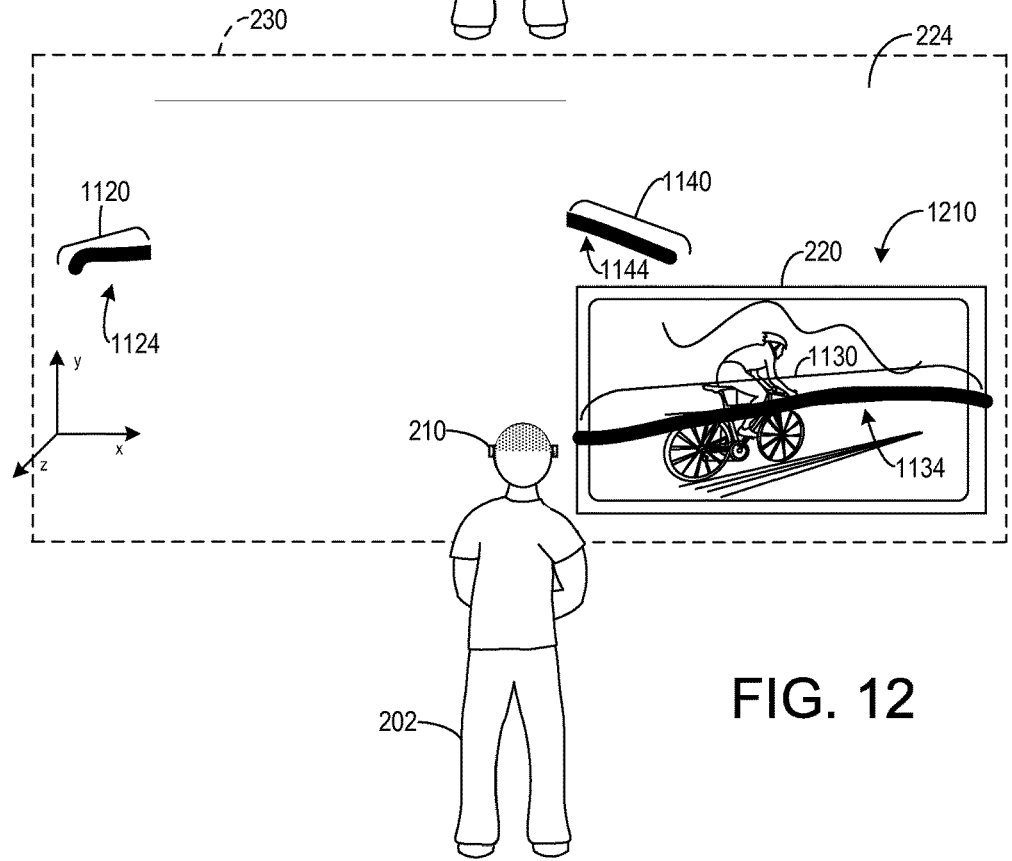
Figure 13:
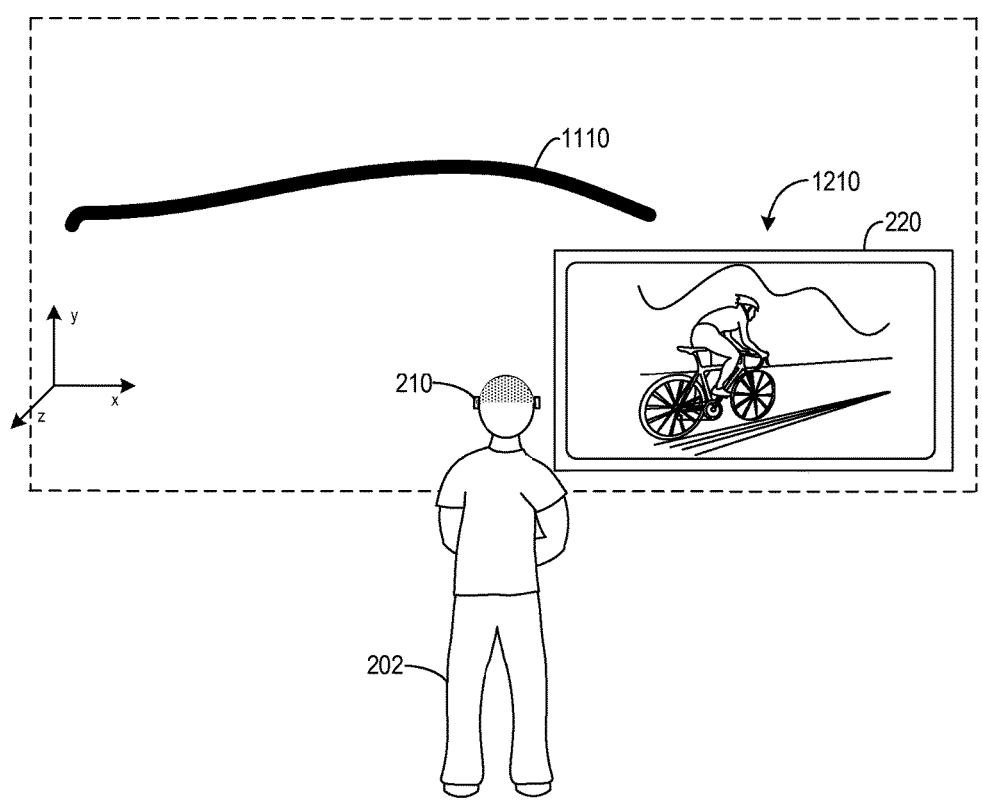
FIG. 13 shows the head-mounted display device of FIGS. 11 and 12 displaying the markup hologram according to another example of the present description.

In some examples, a user 202 may use the display device 210 to display one or more markup holograms that may overlap, intersect or otherwise interact with one or more other holograms. In some examples, a markup hologram may take the form of a line, shape, text, highlighting, image, or any other suitable visual expression. With reference now to FIGS. 11 and 12, in one example the user may instruct the display device 210 to draw a markup hologram in the form of markup line 1110. In this example the markup line 1110 comprises a left portion 1120 at a left markup location 1124, a middle portion 1130 at a middle markup location 1134, and a right portion 1140 at a right markup location 1144. The left portion 1120 and right portion 1140 overlap the virtual surface 230, and the middle portion 1130 overlaps the initial hologram 220.

The display device 210 may world-lock the left portion 1120 and the right portion 1140 to the virtual surface 230, and may world-lock the middle portion 1130 to the initial hologram 220. In other words, the positions of the left portion 1120 and right portion 1140 may be fixed relative to the virtual surface, while the position of the middle portion 1130 may be fixed relative to the initial hologram 220.

With reference to FIG. 12, the user 202 may instruct the display device 210 to move the initial hologram 220 to another virtual location 1210 on the wall 224. In this example, when the initial hologram 220 is moved, the left portion 1120 and right portion 1140 of the markup line 1110 are maintained at their respective markup locations 1124 and 1144. In other words, the left portion 1120 and right portion 1140 remain world-locked to the virtual surface 230. The middle portion 1130 remains world-locked with the initial hologram 220 and moves with the initial hologram. In this manner, the holographic markup line 1110 behaves in a realistic manner that corresponds to the behavior of a real-world line drawn across the wall 224 and a real world framed poster in a similar situation.

In one example, the user 202 may not have intended to break up the holographic markup line 1110 when the user moved the initial hologram 220. Accordingly and in some examples, the user 202 may provide an undo instruction to the display device 210. In response, and with reference to FIG. 13, the display device 210 may rejoin the middle portion 1130 with the left portion 1120 and right portion 1140 to display the entire holographic markup line 1110 in its original position. The display device 210 also may maintain the initial hologram 220 at the other virtual location 1210.

Figure 14:
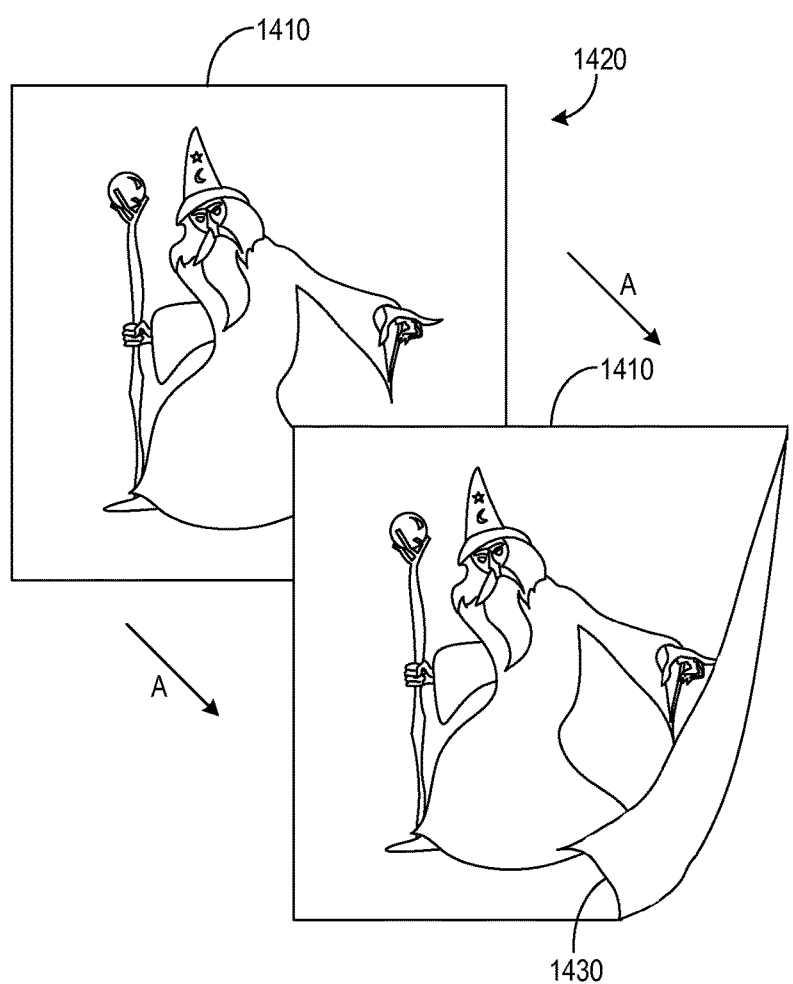
FIG. 14 shows a hologram with an edge animated to simulate bending according to an example of the present description.

With reference now to FIG. 14, to provide a realistic presentation of a hologram, in some examples a hologram displayed by display device 210 may be animated to simulate bending of the represented object. In some examples, the hologram may represent a thin sheet of paper, fabric, a poster, a flag, or any other flexible medium that may bend under certain conditions. In the example of FIG. 14, a hologram 1410 of an unframed poster of a wizard may be displayed. A user may provide an instruction to the display device 210 to move the hologram 1410 from an adjusted virtual location 1420 in the direction of action arrows A.

In this example, while the hologram 1410 is moving, the display device 210 may animate an edge 1430 of the hologram to simulate the edge bending. For example, the edge 1430 may be animated to bend as if the edge were fluttering or flapping in the air due to the movement.

It will be appreciated that the above described examples are provided for descriptive purposes, and that many other examples of holograms having other three dimensional shapes and volumes may be displayed and manipulated according to the principles of the present disclosure.

Figure 15A:
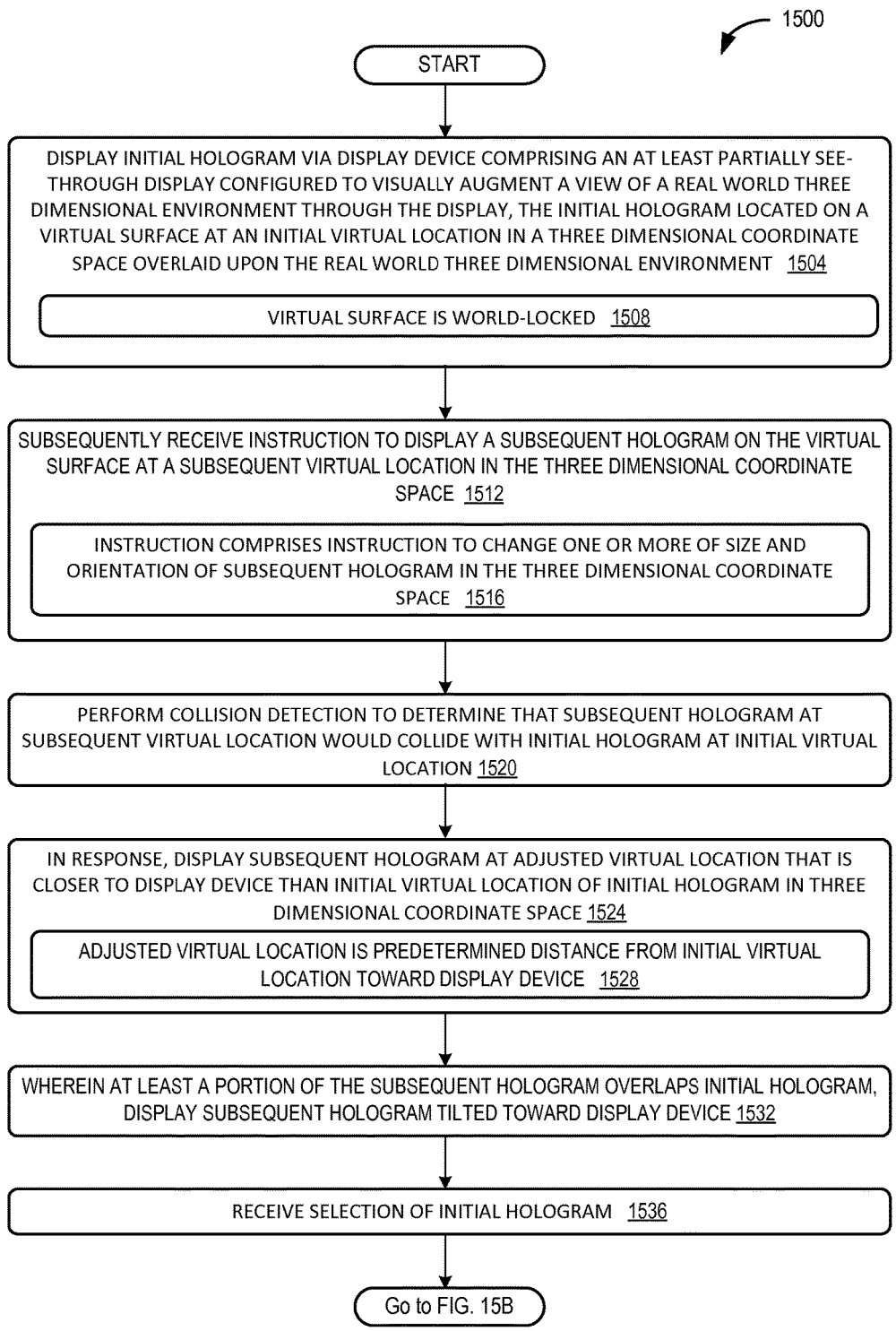
FIGS. 15A and 15B are a flow chart of a method of displaying holograms at adjusted virtual locations according to an example of the present description.
Figure 15B:
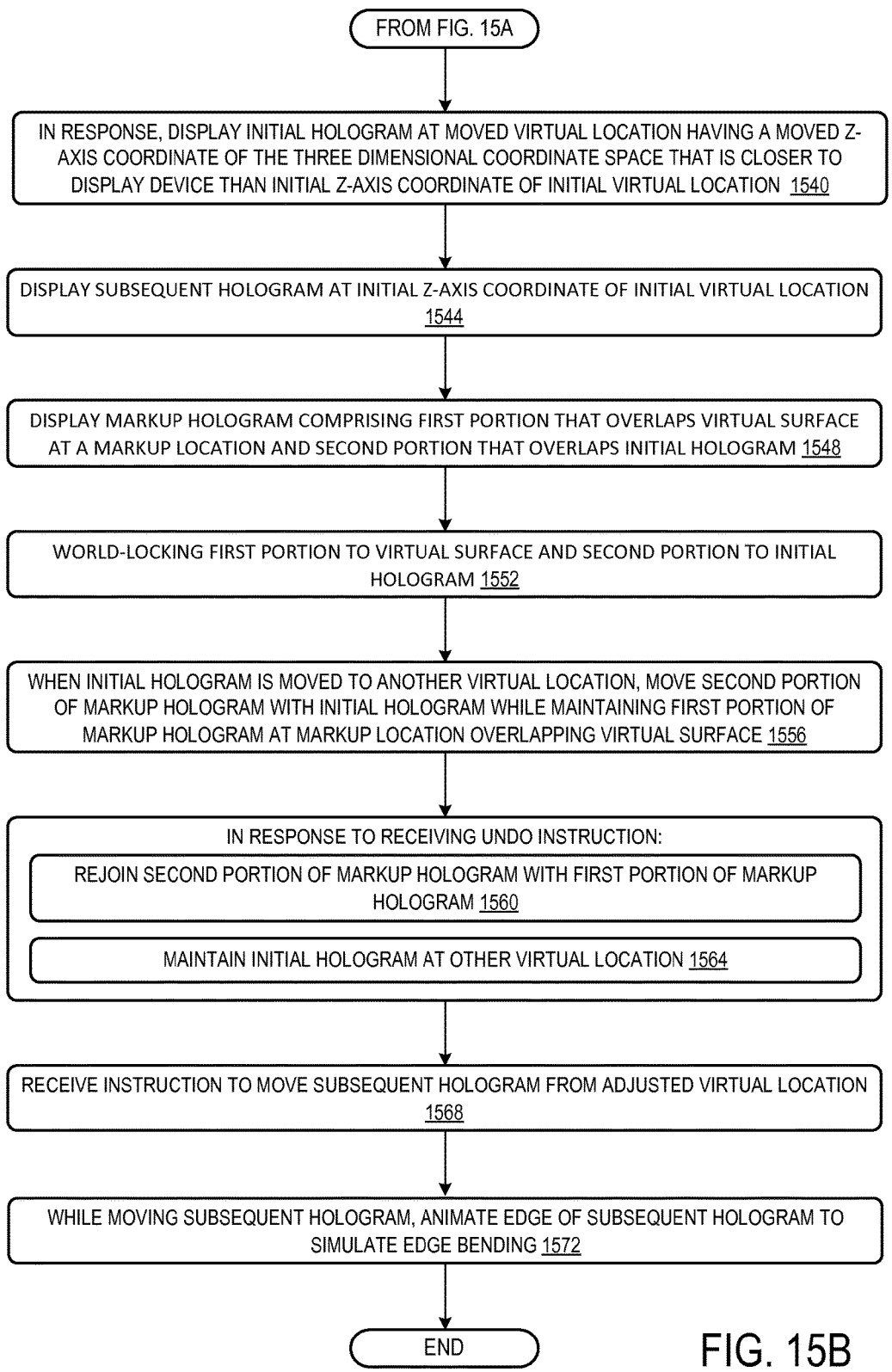

FIGS. 15A and 15B illustrate a flow chart of a method 1500 for displaying holograms at adjusted locations according to examples of the present disclosure. The following description of method 1500 is provided with reference to the software and hardware components described above and shown in FIGS. 1-14. It will be appreciated that method 1500 also may be performed in other contexts using other suitable hardware and software components.

With reference to FIG. 15A, at 1504 the method 1500 may include displaying an initial hologram via a display device comprising an at least partially see-through display configured to visually augment a view of a real world three dimensional environment through the display, the initial hologram located on a virtual surface at an initial virtual location in a three dimensional coordinate space overlaid upon the real world three dimensional environment. At 1508 the virtual surface may be world-locked.

At 1512 the method 1500 may include subsequently receiving an instruction to display a subsequent hologram on the virtual surface at a subsequent virtual location in the three dimensional coordinate space. At 1516 the instruction to display the subsequent hologram may comprise an instruction to change one or more of a size and an orientation of the subsequent hologram in the three dimensional coordinate space.

At 1520 the method 1500 may include performing collision detection to determine that the subsequent hologram at the subsequent virtual location would collide with the initial hologram at the initial virtual location. At 1524 the method 1500 may include, in response to determining that the subsequent hologram at the subsequent virtual location would collide with the initial hologram at the initial virtual location, displaying the subsequent hologram at an adjusted virtual location that is closer to the display device than the initial virtual location of the initial hologram in the three dimensional coordinate space. At 1528 the adjusted virtual location may be a predetermined distance from the initial virtual location toward the display device.

At 1532, where at least a portion of the subsequent hologram at the adjusted virtual location overlaps the initial hologram, the method 1500 may include displaying the subsequent hologram tilted toward the display device. At 1536 the method 1500 may include receiving a selection of the initial hologram. With reference now to FIG. 15B, at 1540 the method 1500 may include, in response to receiving the selection, displaying the initial hologram at a moved virtual location having a moved z-axis coordinate of the three dimensional coordinate space that is closer to the display device than an initial z-axis coordinate of the initial virtual location.

At 1544 the method 1500 may include displaying the subsequent hologram at the initial z-axis coordinate of the initial virtual location. At 1548 the method 1500 may include displaying a markup hologram comprising a first portion that overlaps the virtual surface at a markup location and a second portion that overlaps the initial hologram. At 1552 the method 1500 may include world-locking the first portion to the virtual surface and the second portion to the initial hologram. At 1556 the method 1500 may include, when the initial hologram is moved to another virtual location, moving the second portion of the markup hologram with the initial hologram while maintaining the first portion of the markup hologram at the markup location overlapping the virtual surface.

In response to receiving an undo instruction, the method 1500 may include: at 1560, rejoining the second portion of the markup hologram with the first portion of the markup hologram; and at 1564, maintaining the initial hologram at the other virtual location. At 1568 the method 1500 may include receiving an instruction to move the subsequent hologram from the adjusted virtual location. At 1572 the method 1500 may include, while moving the subsequent hologram, animating an edge of the subsequent hologram to simulate the edge bending.

It will be appreciated that method 1500 is provided by way of example and is not meant to be limiting. Therefore, it is to be understood that method 1500 may include additional and/or alternative steps relative to those illustrated in FIGS. 15A and 15B. Further, it is to be understood that method 1500 may be performed in any suitable order. Further still, it is to be understood that one or more steps may be omitted from method 1500 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 16:
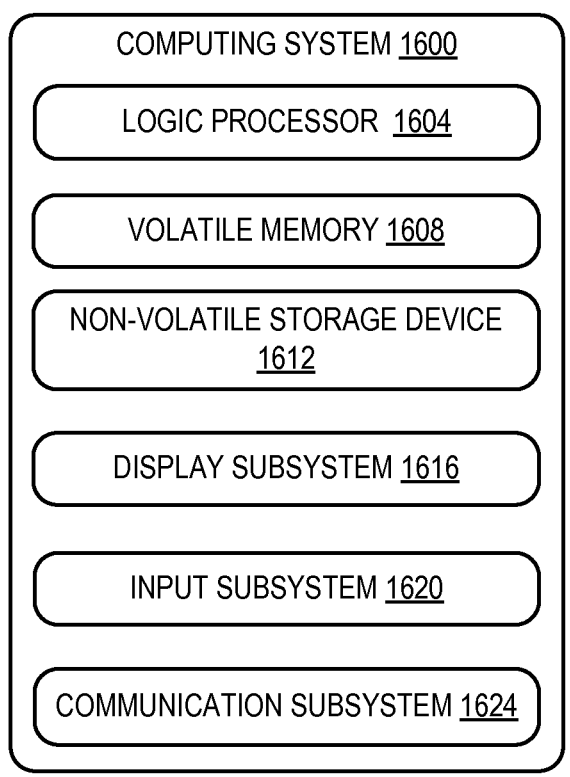
FIG. 16 shows a computing system according to an embodiment of the present description.

FIG. 16 schematically shows a non-limiting embodiment of a computing system 1600 that can enact one or more of the methods and processes described above. Computing system 1600 is shown in simplified form. Computing system 1600 may take the form of one or more head-mounted display devices as shown in FIG. 1, or one or more devices cooperating with a head-mounted display device (e.g., personal computers, server computers, tablet computers, home-entertainment computers, network computing devices, gaming devices, mobile computing devices, mobile communication devices (e.g., smart phone), and/or other computing devices).

Computing system 1600 includes a logic processor 1604, volatile memory 1608, and a non-volatile storage device 1612. Computing system 1600 may optionally include a display subsystem 1616, input subsystem 1620, communication subsystem 1624, and/or other components not shown in FIG. 16.

Logic processor 1604 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1604 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 1608 may include physical devices that include random access memory. Volatile memory 1608 is typically utilized by logic processor 1604 to temporarily store information during processing of software instructions. It will be appreciated that volatile memory 1608 typically does not continue to store instructions when power is cut to the volatile memory 1608.

Non-volatile storage device 1612 includes one or more physical devices configured to hold instructions executable by the logic processors to implement the methods and processes described herein. When such methods and processes are implemented, the state of non-volatile storage device 1612 may be transformed—e.g., to hold different data.

Non-volatile storage device 1612 may include physical devices that are removable and/or built-in. Non-volatile storage device 1612 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1612 may include nonvolatile, dynamic, static, read/write, read-only, sequential-access, location-addressable, file-addressable, and/or content-addressable devices. It will be appreciated that non-volatile storage device 1612 is configured to hold instructions even when power is cut to the non-volatile storage device 1612.

Aspects of logic processor 1604, volatile memory 1608, and non-volatile storage device 1612 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 1600 implemented to perform a particular function. In some cases, a program may be instantiated via logic processor 1604 executing instructions held by non-volatile storage device 1612, using portions of volatile memory 1608. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 1616 may be used to present a visual representation of data held by non-volatile storage device 1612. This visual representation may take the form of a graphical user interface (GUI). As the herein described methods and processes change the data held by the non-volatile storage device, and thus transform the state of the non-volatile storage device, the state of display subsystem 1616 may likewise be transformed to visually represent changes in the underlying data. Display subsystem 1616 may include one or more display devices utilizing virtually any type of technology. Such display devices may be combined with logic processor 1604, volatile memory 1608, and/or non-volatile storage device 1612 in a shared enclosure, or such display devices may be peripheral display devices. The at least partially see-through display of HMD device 10 described above is one example of a display subsystem 1616.

When included, input subsystem 1620 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; any of the sensors described above with respect to position sensor system 18 of FIG. 1; and/or any other suitable sensor.

When included, communication subsystem 1624 may be configured to communicatively couple computing system 1600 with one or more other computing devices. Communication subsystem 1624 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The following paragraphs provide additional support for the claims of the subject application. One aspect provides a method for displaying holograms in an augmented reality environment, comprising: displaying an initial hologram via a display device comprising an at least partially see-through display configured to visually augment a view of a real world three dimensional environment through the display, the initial hologram located on a virtual surface at an initial virtual location in a three dimensional coordinate space overlaid upon the real world three dimensional environment; subsequently receiving an instruction to display a subsequent hologram on the virtual surface at a subsequent virtual location in the three dimensional coordinate space; performing collision detection to determine that the subsequent hologram at the subsequent virtual location would collide with the initial hologram at the initial virtual location; and in response, displaying the subsequent hologram at an adjusted virtual location that is closer to the display device than the initial virtual location of the initial hologram in the three dimensional coordinate space. The method may additionally or optionally include, wherein at least a portion of the subsequent hologram at the adjusted virtual location overlaps the initial hologram, displaying the subsequent hologram tilted toward the display device. The method may additionally or optionally include receiving a selection of the initial hologram; and in response, displaying the initial hologram at a moved virtual location having a moved z-axis coordinate of the three dimensional coordinate space that is closer to the display device than an initial z-axis coordinate of the initial virtual location. The method may additionally or optionally include displaying the subsequent hologram at the initial z-axis coordinate of the initial virtual location. The method may additionally or optionally include wherein the instruction to display the subsequent hologram comprises an instruction to change one or more of a size and an orientation of the subsequent hologram in the three dimensional coordinate space. The method may additionally or optionally include displaying a markup hologram comprising a first portion that overlaps the virtual surface at a markup location and a second portion that overlaps the initial hologram; world-locking the first portion to the virtual surface and the second portion to the initial hologram; and when the initial hologram is moved to another virtual location, moving the second portion of the markup hologram with the initial hologram while maintaining the first portion of the markup hologram at the markup location overlapping the virtual surface. The method may additionally or optionally include in response to receiving an undo instruction: rejoining the second portion of the markup hologram with the first portion of the markup hologram; and maintaining the initial hologram at the other virtual location. The method may additionally or optionally include wherein the adjusted virtual location is a predetermined distance from the initial virtual location toward the display device. The method may additionally or optionally include wherein the virtual surface is world-locked. The method may additionally or optionally include receiving an instruction to move the subsequent hologram from the adjusted virtual location; and while moving the subsequent hologram, animating an edge of the subsequent hologram to simulate the edge bending.

Another aspect provides a head-mounted display device comprising: an at least partially see-through display; a processor; and a non-volatile storage device holding instructions executable by the processor to: display an initial hologram via a display device comprising an at least partially see-through display configured to visually augment a view of a real world three dimensional environment through the display, the initial hologram located on a virtual surface at an initial virtual location in a three dimensional coordinate space overlaid upon the real world three dimensional environment; subsequently receive an instruction to display a subsequent hologram on the virtual surface at a subsequent virtual location in the three dimensional coordinate space; perform collision detection to determine that the subsequent hologram at the subsequent virtual location would collide with the initial hologram at the initial virtual location; and in response, display the subsequent hologram at an adjusted virtual location that is closer to the display device than the initial virtual location of the initial hologram in the three dimensional coordinate space. The head-mounted display device may additionally or optionally include, wherein at least a portion of the subsequent hologram overlaps the initial hologram, and the instructions are executable by the processor to display the subsequent hologram tilted toward the display device. The head-mounted display device may additionally or optionally include, wherein the instructions are executable by the processor to: receive a selection of the initial hologram; and in response, display the initial hologram at a moved virtual location having a moved z-axis coordinate of the three dimensional coordinate space that is closer to the display device than an initial z-axis coordinate of the initial virtual location. The head-mounted display device may additionally or optionally include, wherein the instructions are executable to display the subsequent hologram at the initial z-axis coordinate of the initial virtual location. The head-mounted display device may additionally or optionally include, wherein the instruction to display the subsequent hologram comprises an instruction to change one or more of a size and an orientation of the subsequent hologram in the three dimensional coordinate space. The head-mounted display device may additionally or optionally include, wherein the instructions are executable to: display a markup hologram comprising a first portion that overlaps the virtual surface at a markup location and a second portion that overlaps the initial hologram; world-lock the first portion to the virtual surface and the second portion to the initial hologram; and when the initial hologram is moved to another virtual location, move the second portion of the markup hologram with the initial hologram while maintaining the first portion of the markup hologram at the markup location overlapping the virtual surface. The head-mounted display device may additionally or optionally include, wherein the instructions are executable to, in response to receiving an undo instruction: rejoin the second portion of the markup hologram with the first portion of the markup hologram; and maintain the initial hologram at the other virtual location. The head-mounted display device may additionally or optionally include, wherein the adjusted virtual location is a predetermined distance from the initial virtual location toward the display device. The head-mounted display device may additionally or optionally include wherein the virtual surface is world-locked.

Another aspect provides a head-mounted display device comprising: an at least partially see-through display; a processor; and a non-volatile storage device holding instructions executable by the processor to: display an initial hologram via a display device comprising an at least partially see-through display configured to visually augment a view of a real world three dimensional environment through the display, the initial hologram located on a virtual surface at an initial virtual location in a three dimensional coordinate space overlaid upon the real world three dimensional environment; subsequently receive an instruction to display a subsequent hologram on the virtual surface at a subsequent virtual location in the three dimensional coordinate space; perform collision detection to determine that the subsequent hologram at the subsequent virtual location would collide with the initial hologram at the initial virtual location; in response, display the subsequent hologram at an adjusted virtual location that is closer to the display device than the initial virtual location of the initial hologram in the three dimensional coordinate space; receive an instruction to move the initial hologram from the initial virtual location;

and in response, display the initial hologram at a moved virtual location having a moved z-axis coordinate of the three dimensional coordinate space that is closer to the display device than an initial z-axis coordinate of the initial virtual location.

The invention claimed is:

1. A method for displaying holograms in an augmented reality environment, the method comprising:
    displaying an initial hologram via a display device comprising an at least partially see-through display configured to visually augment a view of a real world three dimensional environment through the display, the initial hologram located on a virtual surface at an initial virtual location in a three dimensional coordinate space overlaid upon the real world three dimensional environment;
    subsequently receiving an instruction to display a subsequent hologram on the virtual surface at a subsequent virtual location in the three dimensional coordinate space;
    performing collision detection to determine that the subsequent hologram at the subsequent virtual location would collide with the initial hologram at the initial virtual location;
    in response, displaying the subsequent hologram at an adjusted virtual location that is closer to the display device than the initial virtual location of the initial hologram in the three dimensional coordinate space;
    displaying a markup hologram comprising a first portion that overlaps the virtual surface at a markup location and a second portion that overlaps the initial hologram;
    world-locking the first portion to the virtual surface and the second portion to the initial hologram; and
    when the initial hologram is moved to another virtual location, moving the second portion of the markup hologram with the initial hologram while maintaining the first portion of the markup hologram at the markup location overlapping the virtual surface.

2. The method of claim 1, wherein at least a portion of the subsequent hologram at the adjusted virtual location overlaps the initial hologram, the method further comprising displaying the subsequent hologram tilted toward the display device.

3. The method of claim 1, further comprising displaying the subsequent hologram at an initial z-axis coordinate of the initial virtual location.

4. The method of claim 1, wherein the instruction to display the subsequent hologram comprises an instruction to change one or more of a size and an orientation of the subsequent hologram in the three dimensional coordinate space.

5. The method of claim 1, further comprising, in response to receiving an undo instruction:
    rejoining the second portion of the markup hologram with the first portion of the markup hologram; and
    maintaining the initial hologram at the other virtual location.

6. The method of claim 1, wherein the adjusted virtual location is a predetermined distance from the initial virtual location toward the display device.

7. The method of claim 1, wherein the virtual surface is world-locked.

8. The method of claim 1, further comprising:
    receiving an instruction to move the subsequent hologram from the adjusted virtual location; and
    while moving the subsequent hologram, animating an edge of the subsequent hologram to simulate the edge bending.

9. A head-mounted display device, comprising:
    an at least partially see-through display;
    a processor; and
    a non-volatile storage device holding instructions executable by the processor to:
        display an initial hologram via a display device comprising an at least partially see-through display configured to visually augment a view of a real world three dimensional environment through the display, the initial hologram located on a virtual surface at an initial virtual location in a three dimensional coordinate space overlaid upon the real world three dimensional environment;
        subsequently receive an instruction to display a subsequent hologram on the virtual surface at a subsequent virtual location in the three dimensional coordinate space;
        perform collision detection to determine that the subsequent hologram at the subsequent virtual location would collide with the initial hologram at the initial virtual location;
        in response, display the subsequent hologram at an adjusted virtual location that is closer to the display device than the initial virtual location of the initial hologram in the three dimensional coordinate space;
        display a markup hologram comprising a first portion that overlaps the virtual surface at a markup location and a second portion that overlaps the initial hologram;
        world-lock the first portion to the virtual surface and the second portion to the initial hologram; and
        when the initial hologram is moved to another virtual location, move the second portion of the markup hologram with the initial hologram while maintaining the first portion of the markup hologram at the markup location overlapping the virtual surface.

10. The head-mounted display device of claim 9, wherein at least a portion of the subsequent hologram overlaps the initial hologram, and the instructions are executable by the processor to display the subsequent hologram tilted toward the display device.

11. The head-mounted display device of claim 9, wherein the instructions are executable to display the subsequent hologram at the initial z-axis coordinate of the initial virtual location.

12. The head-mounted display device of claim 9, wherein the instruction to display the subsequent hologram comprises an instruction to change one or more of a size and an orientation of the subsequent hologram in the three dimensional coordinate space.

13. The head-mounted display device of claim 9, wherein the instructions are executable to, in response to receiving an undo instruction:
    rejoin the second portion of the markup hologram with the first portion of the markup hologram; and
    maintain the initial hologram at the other virtual location.

14. The head-mounted display device of claim 9, wherein the adjusted virtual location is a predetermined distance from the initial virtual location toward the display device.

15. The head-mounted display device of claim 9, wherein the virtual surface is world-locked.

16. A head-mounted display device, comprising:
    an at least partially see-through display;
    a processor; and a non-volatile storage device holding instructions executable by the processor to:
  display an initial hologram via a display device comprising an at least partially see-through display configured to visually augment a view of a real world three dimensional environment through the display, the initial hologram located on a virtual surface at an initial virtual location in a three dimensional coordinate space overlaid upon the real world three dimensional environment;
  subsequently receive an instruction to display a subsequent hologram on the virtual surface at a subsequent virtual location in the three dimensional coordinate space;
  perform collision detection to determine that the subsequent hologram at the subsequent virtual location would collide with the initial hologram at the initial virtual location;
  in response, display the subsequent hologram at an adjusted virtual location that is closer to the display device than the initial virtual location of the initial hologram in the three dimensional coordinate space;
  display a markup hologram comprising a first portion that overlaps the virtual surface at a markup location and a second portion that overlaps the initial hologram;
  world-lock the first portion to the virtual surface and the second portion to the initial hologram; and
  when the initial hologram is moved to another virtual location, move the second portion of the markup hologram with the initial hologram while maintaining the first portion of the markup hologram at the markup location overlapping the virtual surface; and
  while moving the subsequent hologram, animate an edge of the subsequent hologram to simulate the edge bending.

17. The method of claim 1, further comprising:
receiving a selection of the initial hologram; and
in response, displaying the initial hologram at a moved virtual location having a moved z-axis coordinate of the three dimensional coordinate space that is closer to the display device than an initial z-axis coordinate of the initial virtual location.

18. The head-mounted display device of claim 9, wherein the instructions are executable by the processor to:
receive a selection of the initial hologram; and
in response, display the initial hologram at a moved virtual location having a moved z-axis coordinate of the three dimensional coordinate space that is closer to the display device than an initial z-axis coordinate of the initial virtual location.

* * * * *